Patented Sept. 17, 1929

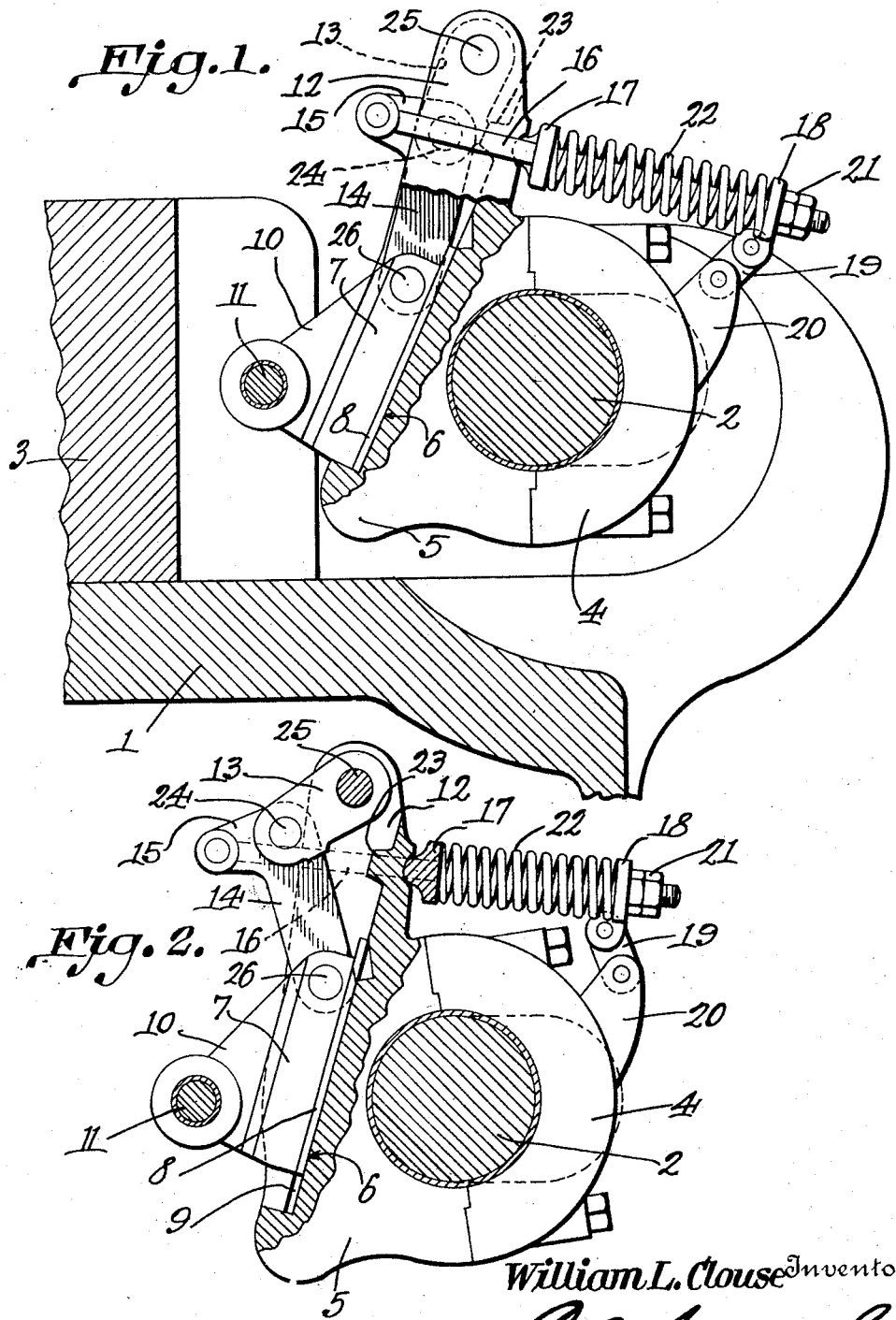

1,728,203

UNITED STATES PATENT OFFICE

WILLIAM L. CLOUSE, OF TIFFIN, OHIO, ASSIGNOR TO THE NATIONAL MACHINERY CO., OF TIFFIN, OHIO

RELIEF PITMAN

Application filed January 12, 1927. Serial No. 160,694.

This invention relates to presses, shears, bulldozers, forging machines and the like, and more particularly to an automatic relief connection between the operating shaft and the heading slide or other driven element whereby, should the movement of said element be interfered with by an unyielding obstruction, the machine would be relieved automatically of excessive strain and consequent injury.

The present invention is designed primarily as an improvement upon the structure disclosed in my patent No. 1,366,361 issued on January 25, 1921. While the structure disclosed in said patent is very efficient under most conditions, it has been found impractical in very heavy structures because of the large bearings required for the link construction in order to get the necessary strength.

It is an object of the present invention to materially simplify the relief connection so that it can be made compact and yet be able to withstand the maximum pressures to which it might be subjected.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed, without departing from the spirit of the invention.

In the accompanying drawings, the preferred form of the invention has been shown. In said drawings, Figure 1 is a view partly in longitudinal section and partly in elevation showing the improved relief mechanism constituting the present invention, the parts being shown in their normal positions.

Figure 2 is a view of a portion of the mechanism showing one of the positions to which the parts will shift automatically when subjected to excessive resistance during the actuation of the heading slide.

Referring to the figures by characters of reference 1 designates a portion of the body of the machine in which is journaled the operating crank 2 whereby the heading slide 3 is driven. The crank 2 is mounted for rotation within a collar 4 having an extension 5 and formed within this collar is a guide groove 6 obliquely disposed relative to the line of thrust between the crank and heading slide. A block 7 is mounted to slide within this groove, being properly retained therein by any suitable means such as side flanges 8 projecting into side grooves 9 one of which has been shown. The block 7 has a wing 10 pivotally connected, as at 11, to the heading slide 3. A forked extension 12 is provided on the collar 5 at one end of the groove 6 and pivotally mounted within this extension is one link 13 of a toggle. The other link 14 of this toggle is pivotally attached to one end of the block 7 as well as to the link 13 and has an arm 15 extending therefrom adjacent link 13. To this arm are pivotally connected restraining rods 16 slidable in a guide 17 which bears against the extension 12. A head 18 is movably connected by a link 19 to an ear 20 extending from the collar 4 and the rods 16 are adjustably connected to this head by means of nuts 21. Springs 22 are interposed between the guide 17 and head 18.

The springs 22 are constantly under compression and exert a backward thrust against the head 18 so as to hold the link 13 of the toggle normally pressed against a stop 23. This arrangement of the parts has been shown in Figure 1 and it will be observed that with the parts thus located the intermediate pivot 24 of the toggle is out of line with the remaining pivots of the toggle indicated at 25 and 26.

The mechanism constituting the present invention is so located and proportioned that, when the heading slide 3 is in its fully projected position, the center of the pivot 11 is in line with the center of the opening in the collar 4, said line being parallel with the path of movement of the heading slide, as shown particularly in Figure 1. As the crank 2 revolves the collar 4 will be pulled back and forth, setting up a rocking action about the pivot 11 and the crank 2 like that of an ordinary pitman connection thereby imparting a back and forth right line movement to the slide 3. The inner or bottom surface of the recess 6 is at all times obliquely disposed relative to the line connecting the centers of pivot 11 and the opening in bearing 4. Consequently block 7 cooperates with this obliquely disposed surface to constitute a wedge held normally against one end wall of the recess 6 by the spring restrained toggle. Therefore, under normal conditions, the axis of the collar 4 and the center of the pivot 11 are maintained the same distance apart. When, however, the heading slide is subjected to an unyielding obstruction so as to interfere with its forward movement while the crank 2 is still operating, the excessive pressure due to the resistance of the object will cause the slide 7 to press against the toggle, causing the same to break against the action of the springs 22 as shown particularly in Figure 2. Consequently the crank can continue to rotate past its dead center even though the heading slide should be held back from its extreme advanced position. After the excessive strain has been removed the springs 22 will return the toggle and the slide 7 to their normal positions as shown in Figure 1.

It will be noted that by providing a structure such as described it does not become necessary to employ large heavy bearings as in relief devices heretofore produced and, consequently, the mechanism can be embodied in all types of heading, forging and other similar machinery.

What is claimed is:

1. The combination with a slide and a rotatable actuating member, of a pitman connection between the member and slide including members connected for relative sliding movement along a path obliquely disposed relative to the line of thrust through the pitman, and yielding means for holding the members normally against relative sliding movement, said means including a toggle connected at opposed ends to the respective members, the intermediate pivot of the toggle being normally positioned close to but out of the dead center, and yielding means for holding the toggle in normal position.

2. The combination with a slide mounted for right-line movement, of a pitman including relatively movable members, one of said members having a slide portion and the other member having an obliquely disposed guide for engagement by the slide portion, rotatable means for actuating the pitman to reciprocate the first named slide and vary the angle of the guide relative to the path of movement of the first named slide, and yielding means for holding the members of the pitman normally against relative movement.

3. The combination with a driven member, of a pitman connected thereto comprising relatively movable members, one of said pitman members including a guide and the other pitman member including an obliquely disposed slide for engagement with the guide, means for actuating the pitman to shift the driven member and vary the angle of the slide and guide relative to the path of movement of the driven member, and yielding means for holding the members of the pitman normally against relative movement.

4. The combination with a driven member, of a pitman pivotally connected thereto including separate members having cooperating faces movable relative to each other along a path obliquely disposed relative to the longitudinal axis of the pitman and in a plane parallel with the path of movement of the pitman, means for actuating the pitman to vary the angle of the cooperating faces of the pitman members relative to the path of movement of the driven member, and yielding means for holding the members of the pitman normally against relative sliding movement, said means including a toggle connected at opposite ends to the respective members of the pitman, the intermediate pivot of the toggle being normally positioned close to but out of the dead center and a spring restrained member for maintaining the toggle in normal position under normal conditions.

In testimony that I claim the foregoing as my own, I have hereto affixed my signature.

WILLIAM L. CLOUSE.